(12) United States Patent
Hoose (10) Patent No.: US 6,487,019 B2
(45) Date of Patent: Nov. 26, 2002

(54) OPTICAL DIFFRACTION GRATING STRUCTURE WITH REDUCED POLARIZATION SENSITIVITY

(75) Inventor: John Hoose, Fairport, NY (US)

(73) Assignee: Chromaplex, Inc., West Henrietta, NY (US)

(*) Notice: Subject to any disclaimer, the term of this patent is extended or adjusted under 35 U.S.C. 154(b) by 0 days.

(21) Appl. No.: 09/816,515

(22) Filed: Mar. 23, 2001

(65) Prior Publication Data

US 2001/0046087 A1 Nov. 29, 2001

Related U.S. Application Data (60) Provisional application No. 60/192,396, filed on Mar. 27, 2000.

(51) Int. Cl.$^7$ ................................................ G02B 5/18
(52) U.S. Cl. ........................ 359/575; 359/571; 359/130
(58) Field of Search ................................. 359/575, 571, 359/572, 130

(56) References Cited

U.S. PATENT DOCUMENTS 4,736,360 A * 4/1988 McMahon ..................... 370/3
5,737,125 A * 4/1998 Ohashi ........................ 359/565

FOREIGN PATENT DOCUMENTS

| JP | 56/057010 | 5/1981 | ............ G02B/5/18 |
| JP | 60/216552 | 10/1985 | ......... H01L/21/302 |
| JP | 63/074014 | 4/1988 | ............ G02B/6/12 |
| JP | 63-276004 | 11/1988 | |

* cited by examiner

Primary Examiner—Cassandra Spyrou
Assistant Examiner—Alessandro V. Amari
(74) Attorney, Agent, or Firm—Ropes & Gray (57) ABSTRACT

A grating device with a substantially polarization-independent diffraction efficiency is disclosed. The grating device is preferably a surface grating that can be produced by ruling or holographically, and includes at least two different grating elements with the same grating period, but different modulation depths or blaze angles. The blaze angles and the illuminated areas of the respective grating elements can be selected to produce a substantially polarization-independent and optionally also wavelength-independent response of the grating device.

15 Claims, 11 Drawing Sheets

OPTICAL DIFFRACTION GRATING STRUCTURE WITH REDUCED POLARIZATION SENSITIVITY

CROSS-REFERENCE TO OTHER PATENT APPLICATIONS

This application claims the benefit of U.S. provisional Patent Application No. 60/192,396, filed Mar. 27, 2000.

FIELD OF THE INVENTION

The invention relates to the diffraction of light by a surface grating, and more particularly to a surface grating structure that eliminates or at least reduces the polarization-dependence of the diffraction efficiency of such grating.

BACKGROUND OF THE INVENTION

Increasingly, information transmitted over long distances increasingly travels over fiber-optic communication systems. It is well known that standard single-mode fiber may not preserve to preserve the launched state of polarization (SOP) of optical signals propagating through the fiber. Moreover, the SOP usually varies with time at any given point along the fiber due to small changes in the physical environment of the fiber or in the optical wavelengths. These random polarization fluctuations can affect transmission systems that employ polarization-sensitive optical components, such as optical amplifiers, coherent optical receivers or polarization-dependent photonic switches and demultiplexers. Polarization scramblers have recently been employed in optically amplified transoceanic communication systems, where they are used, for example, to eliminate anisotropic gain saturation (polarization hole burning) in the optical amplifiers by depolarizing the launched optical signal. Accordingly, optical components used with optical fibers should be made polarization independent, thereby reducing costs and complexity of the fiber-optic communications system.

In wavelength division multiplexed (WDM) systems, different channels are associated with different optical wavelengths. Channel allocations for dense WDM systems are determined by complex engineering tradeoffs relating both to transmission effects and to technology constraints at the transmitter, demultiplexers, and receivers. The international telecommunications union (ITU) standards body has proposed a channel allocation grid with 100 GHz channel spacing (~0.81 nm at a 1550 nm wavelength) on even 100 GHz intervals, counting nominally in both directions from a center frequency of 193.1 THz. Newer systems are being designed to reduce the channel spacing to 50 GHz or less. In addition, the total wavelength range over which these devices are designed to operate is increasing. Hence, devices are required for separating (demultiplexing) the various wavelengths from a common transmission fiber into separate optical channels and for combining (multiplexing) the various optical channels back into a single fiber. Passive wavelength-selective components include interference filters, fiber Bragg gratings, arrayed waveguide gratings (AWG), and free space gratings, such as surface relief diffraction gratings. Many of these wavelength-selective components have a polarization-sensitive response.

It would therefore be desirable to provide multiplexers and demultiplexers that have a uniform and constant diffraction efficiency over the wavelength range of interest independent of the polarization state of the light.

SUMMARY OF THE INVENTION

The invention is directed to an optical surface diffraction grating designed to provide a substantially identical diffraction efficiency over a certain wavelength range for two orthogonal polarization directions of light. According to one aspect of the invention, the grating includes at least one first grating element with a grating period and a first height defining a modulation depth of a first grating relief pattern, and at least one second grating element with the same grating period, and a second height defining a modulation depth of a second grating relief pattern. The second height is different from the first height. The first and second grating elements are arranged substantially side-by-side. The first height and the second height are selected so that an average value formed from the diffraction efficiencies of the first and second grating elements over the preselected wavelength range is substantially identical for two orthogonal polarization directions.

According to another aspect of the invention, an optical wavelength division demultiplexer using the substantially polarization-independent grating device includes at least one optical illumination source and a plurality of optical receiving devices receiving wavelength-selected diffracted optical radiation from the grating device. The characteristic features of the grating device are selected so that the intensity of the wavelength-selected diffracted optical radiation is substantially independent of a direction of polarization of the at least one optical illumination source.

According to yet another aspect of the invention, an optical wavelength division multiplexer using the substantially polarization-independent grating device includes a plurality of optical illumination sources and at least one optical receiving device wavelength-combined diffracted optical radiation from the grating device. The characteristic features of the grating device are selected so that the intensity of the wavelength-combined diffracted optical radiation is substantially independent of a direction of polarization of the plurality of optical illumination sources.

According to another aspect of the invention, a method of producing diffracted optical radiation that is substantially independent of the polarization direction of illuminating optical radiation over a preselected wavelength range is disclosed. The method includes diffracting a first portion of the illuminating optical radiation on at least one first grating element having a grating period and a first height defining a modulation depth of a first grating relief pattern, and diffracting a second portion of the illuminating optical radiation on at least one second grating element having the same grating period and a second height different from the first height and defining a modulation depth of a second grating relief pattern. The diffracted first and second portions are combined to form the diffracted optical radiation. The first height and the second height, and the first portion and the second portion, respectively, are selected so that an average value formed from the diffraction efficiencies of the first and second grating elements over the preselected wavelength range and the illuminated area is substantially identical for two orthogonal polarization directions. Such polarization-insensitive multiplexers and demultiplexers can be applied in wavelength division multiplexed (WDM) fiberoptic telecommunication systems.

Embodiments of the invention may include one or more of the following features. The average value of the diffraction efficiency may be weighted according to a ratio of surface areas of the first and second grating elements exposed to optical radiation illuminating the grating device. To obtain a substantially wavelength-independent diffraction efficiency, the first height and the second height can be selected so that a slope of the diffraction efficiency of the first grating element as a function of wavelength over the predetermined wavelength range is opposite in sign from a slope of the diffraction efficiency of the second grating element over the predetermined wavelength range. The grating elements may be ruled gratings, in which case the respective heights of the first and second grating relief patterns define respective blaze angles, or the gratings may be fabricated by holographic means. The first and second grating elements may be arranged in a geometrical pattern on a common surface, which can be flat or curved, for example, concave to provide focusing. The geometrical pattern may be a stripe or checkerboard pattern or any other suitable pattern. The grooves of the grating elements may be aligned parallel or at an angle with respect to areas where the different grating elements are joined. The area where the grating elements are joined may be apodized.

Additional features and advantages of the present invention will be apparent from the following description of preferred embodiments and from the claims.

BRIEF DESCRIPTION OF THE DRAWINGS

The following figures depict certain illustrative embodiments of the invention in which like reference numerals refer to like elements. These depicted embodiments are to be understood as illustrative of the invention and not as limiting in any way.

DETAILED DESCRIPTION OF CERTAIN ILLUSTRATED EMBODIMENTS

The invention is directed to an optical surface grating with a grating efficiency that is substantially independent of the wavelength over a predetermined wavelength range. In particular, the surface grating described herein can be employed for wavelength division multiplexing/demultiplexing (WDM/D) in fiberoptic transmission systems.

Figure 1:
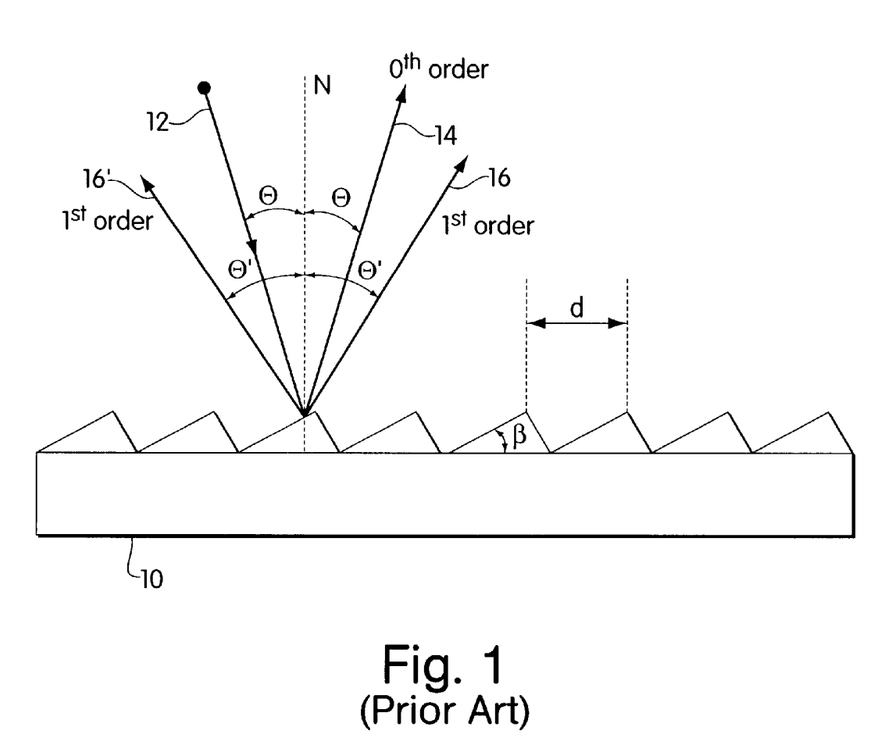
FIG. 1 is a conventional planar diffraction grating.

By way of background information, FIG. 1 shows a typical surface relief diffraction grating 10 with a grating period or pitch d. The grating has a blaze angle β. An incoming optical beam 12 making an angle Θ with the surface normal N is reflected under the same angle Θ as a $0^{th}$ order beam 14, with the diffracted $1^{st}$ order beam 16 making an angle Θ' with the surface normal N. Those skilled in the art will appreciate that gratings can be employed either in reflection or transmission and that the blaze angle β can be selected to produce a high grating efficiency at selected wavelengths and/or diffraction orders. In a reflective Littrow configuration, the blaze angle β is selected to be substantially identical to the angle Θ between the diffracted beam and the surface normal N, so that the grating operates essentially as a wavelength-selective mirror.

Figure 2:
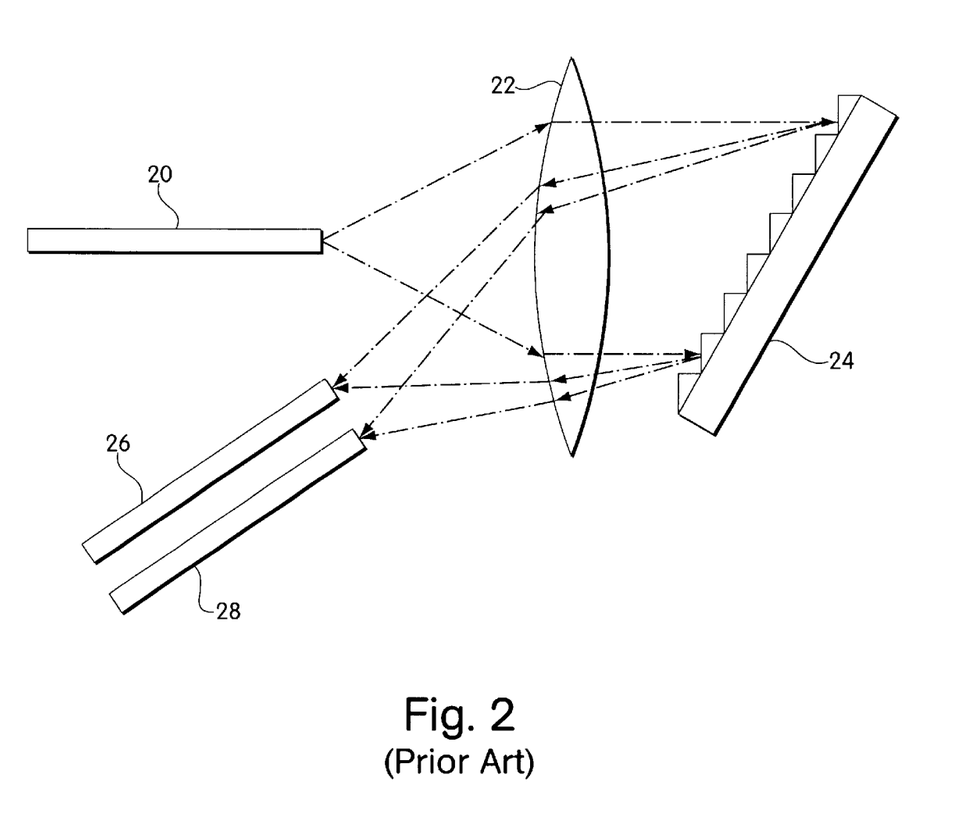
FIG. 2 shows schematically a conventional WDM/D with input fibers and output fibers utilizing a planar grating and focusing lens.

An exemplary wavelength division multiplexer/demultiplexer (WDM/D) made with a reflective surface relief plane grating in a Littrow configuration is illustrated in FIG. 2. During the remainder of this document, the acronym WDM/D is used to denote both multiplexers and demultiplexers. Light from an optical communication fiber 20 is collimated by an imaging device 22, such as a lens or mirror. The collimated light exiting the lens 22 then proceeds to a diffraction grating 24 which can be a conventional surface relief grating or a grating according to the invention, as described in more detail with reference to FIGS. 9 and 10 below. The periodic grating structure diffracts the light at an angle Θ' (see FIG. 1) that depends on the particular wavelength of the light. For example, light with a longer wavelength will be diffracted and collimated by lens 22 to impinge on fiber 28, whereas light with a shorter wavelength will be diffracted and collimated by lens 22 to impinge on fiber 26. It will be understood that the optical fibers 26, 28 can be replaced by other devices, such as detectors and sensors. In a demultiplexer configuration, the light will exit from devices 26, 28 and be combined into the single fiber 20, or another suitable optical device.

Figure 3:
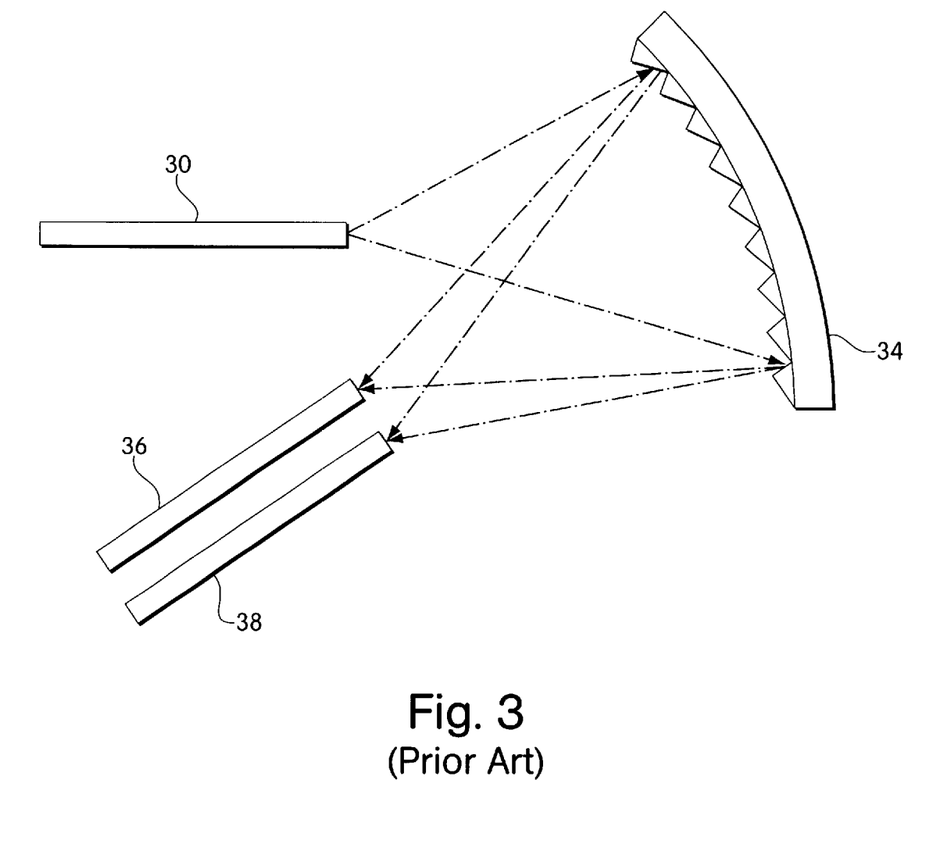
FIG. 3 shows schematically a conventional WDM/D using a concave diffraction grating.

As seen in FIG. 3, the lens 22 can be eliminated by using a curved diffraction grating. Light emitted by fiber 30 is again wavelength-selectively focused onto fibers 36 and 38.

The diffraction efficiency of diffraction gratings is typically different for different polarization directions as defined by the directions of the electric field. Light having an arbitrary polarization direction can be described as a combination of two orthogonal polarization directions, with the "P" polarization direction being polarized parallel to the grooves to the grating and the "S" polarization direction being polarized perpendicular to the grooves to the grating.

Figure 4:
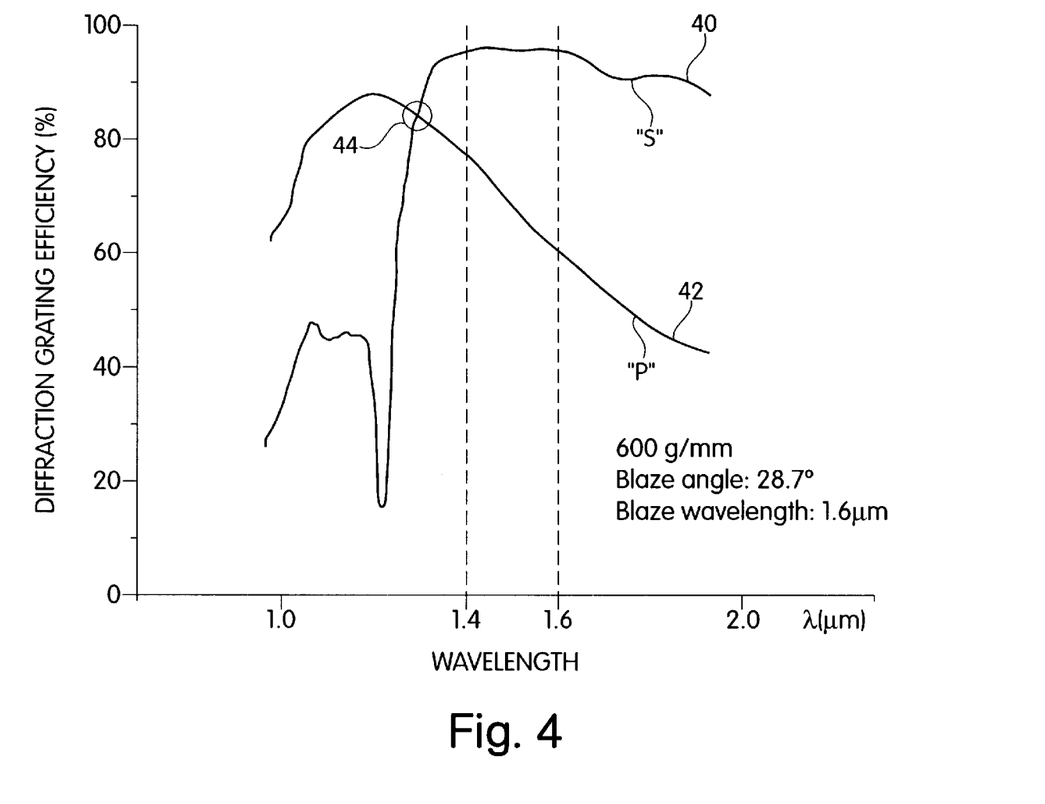
FIG. 4 shows diffraction grating efficiency curves of a ruled grating with a blaze angle of 28.7° as a function of wavelength for two orthogonal polarization directions "S" and "P"

FIG. 4 depicts a graph of the grating efficiency of a grating with 600 grooves/mm, a blaze angle of 28.7°, and a blaze wavelength of 1.6 μm. As seen from FIG. 4, for "S"-polarization (curve 40), the grating has a high and essentially wavelength-independent diffraction efficiency in the wavelength range between 1.3 μm and 1.7 μm, which includes the blaze wavelength of 1.6 μm. However, over the same wavelength range, the diffraction efficiency varies strongly for "P"-polarization (curve 42).

Figure 5:
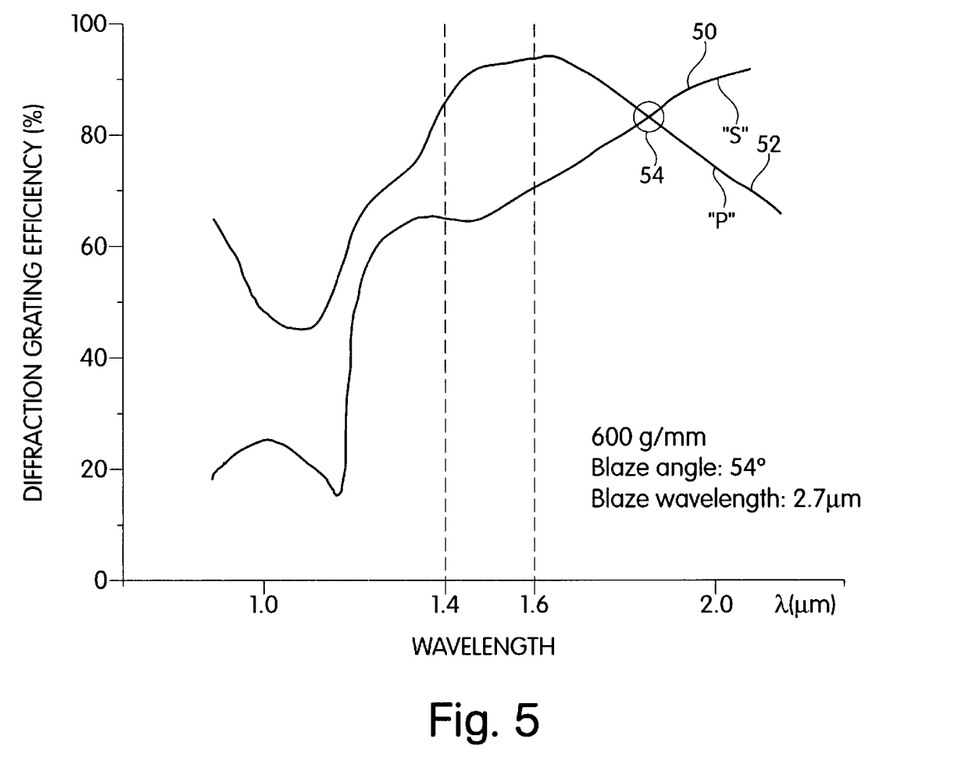
FIG. 5 shows diffraction grating efficiency curves of a ruled grating with a blaze angle of 54° as a function of wavelength for two orthogonal polarization directions "S" and "P"

FIG. 5 depicts a graph of the grating efficiency of a grating with 600 grooves/mm, a blaze angle of 54°, and a blaze wavelength of 2.7 μm. As seen from FIG. 5, for "S"-polarization (curve 50), the grating has a diffraction efficiency in the wavelength range between 1.3 μm and 1.7 μm that increases with wavelength and is lower than the diffraction efficiency of curve 40 of FIG. 4. The grating diffraction efficiency for "S"-polarization has its maximum at the blaze wavelength of 2.7 μm. Over the same wavelength range, the diffraction efficiency for "P"-polarization (curve 52) is greater than that for "S" polarization and also increases with wavelength.

Figure 6:
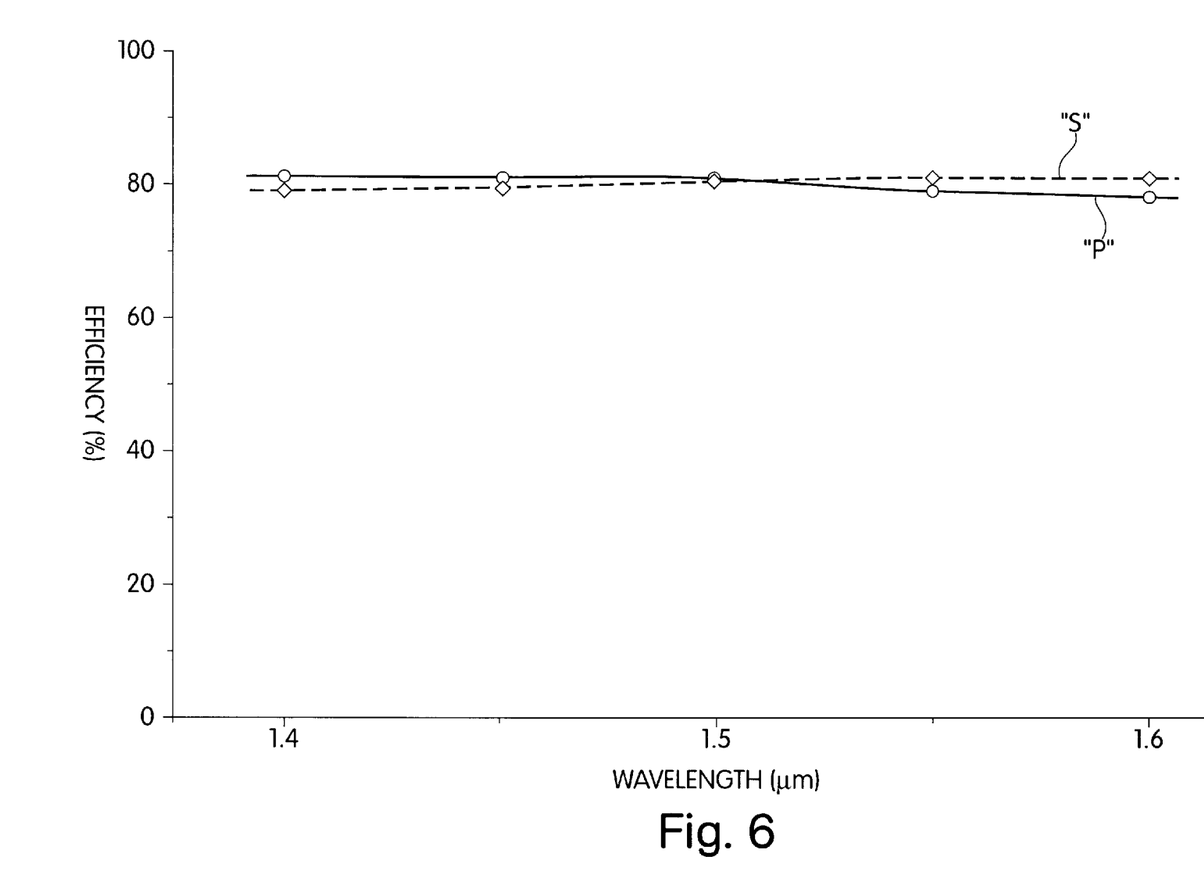
FIG. 6 shows the efficiency of a "combined" grating made from the gratings of FIGS. 4 and 5 with equal illuminated surface areas.

Referring now to FIG. 6, the overall efficiency of a grating structure that combines these two exemplary gratings in form of elements of a two-dimensional grating pattern to be described below, assuming uniform illumination across equal areas, would then be equal to the arithmetic mean of the efficiencies of the individual grating elements for the two polarization directions "S" and "P". It the illuminated areas are not equal, then the arithmetic mean should be weighted according to the relative surface coverage of the two grating elements illuminated by the optical beam. As seen from FIG. 6, the grating efficiency is approximately 80% (±5%) for both the "S" and the "P" polarization direction and remains almost constant over the wavelength range between 1.4 and 1.6 μm that is of interest for optical communication.

Figure 7:
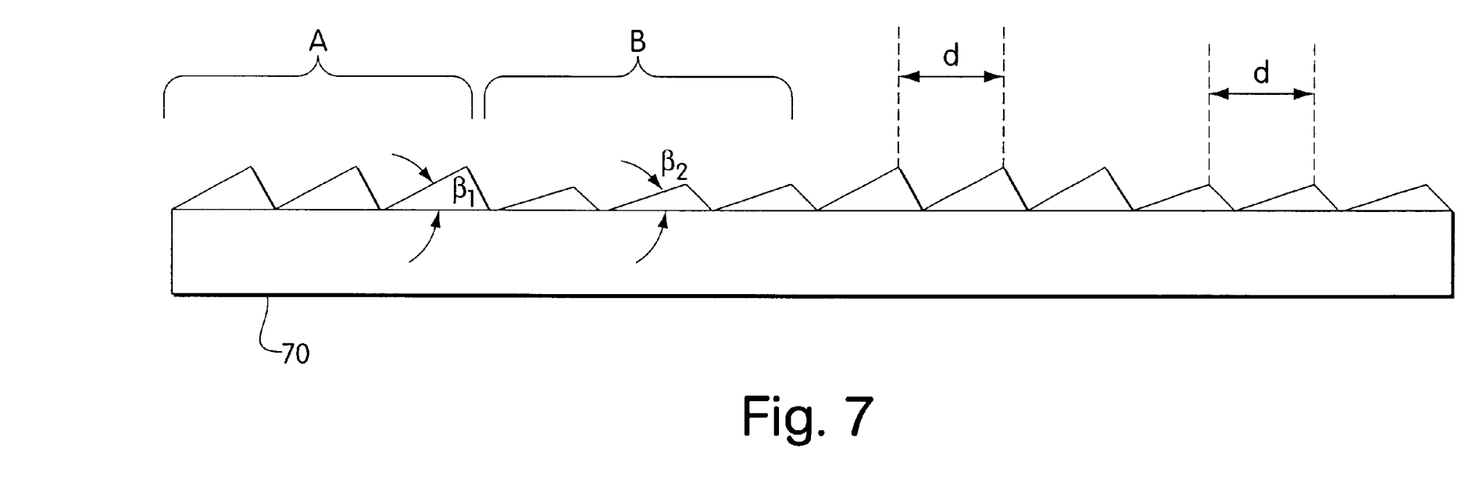
FIG. 7 shows schematically a cross section through a ruled grating having a combination of different grating structures.

Referring now to FIG. 7, the substantially polarization-independent grating efficiency depicted in FIG. 6 can be obtained by a planar grating 70 or curved grating (not shown) having two different grating structures A and B with different blaze angles $\beta_1$, $\beta_2$. Both grating structures have the same grating period or pitch d. The blaze angles $\beta_1$, $\beta_2$, respectively, can be selected so that the operating wavelength range is away from the regions (44 in FIG. 4, and 54 in FIG. 5) where the efficiency curves 40, 42 and 50, 52, respectively, for the two respective polarization directions "S" and "P" intersect. In addition, to obtain the substantially wavelength-independent grating diffraction efficiency of the entire grating, the blaze angles $\beta_1$, $\beta_2$ are selected so that the slope of the grating efficiency of the first grating structure with the blaze angle $\beta_1$ as a function of the wavelength for a specified polarization direction is opposite to the slope of the grating efficiency of the second grating structure with the blaze angle $\beta_2$ for the same wavelength range and polarization direction. In the event that the grating efficiency of the first grating structure with the blaze angle $\beta_1$ as a function of the wavelength for a specified polarization direction is substantially constant, then the grating efficiency of the second grating structure with the blaze angle $\beta_2$ for the same wavelength range and polarization direction should also be substantially constant. For example, for the first grating structure of FIG. 4, the slope for the "P" polarization is negative between 1.4 μm and 1.6 μm. Accordingly, for the second grating structure of FIG. 5, the slope for the "P" polarization is selected to be positive between 1.4 μm and 1.6 μm.

Conversely, for the first grating structure, the slope for the "P" polarization may be positive and the slope for the "S" polarization negative. Following the above, for the second grating structure, the slope for the "P" polarization should then be negative and the slope for the "S" polarization positive. It will be understood that more than two grating structures can be employed, so that the surface grating can have more than two different blaze angles.

The different groove structures can be generated, for example, by a ruling engine, by holography, and by other suitable means known in the art, such as photolithography, electron beam exposure, ion beam milling, direct laser writing, and the like. The exemplary grating of FIG. 7 has a first grating section A with three grooves with a first blaze angle $\beta_1$, alternating with a second grating section B with three grooves with a second blaze angle $\beta_2$ that is different from $\beta_1$. The grating pitch d for A and B is identical. However, the number of grooves of each grating section is to be understood as being exemplary only. For example, each section could include more or less than three grooves, such as a single groove, and/or the grating sections could be arranged in different patterns, as illustrated schematically in FIGS. 8–10. As mentioned before, the grating structure of the invention will perform optimally under uniform illumination. Grating section A is to be understood as producing the grating efficiency response of FIG. 4, with the grating section B producing the grating efficiency response of FIG. 5, or vice versa.

Figure 8:
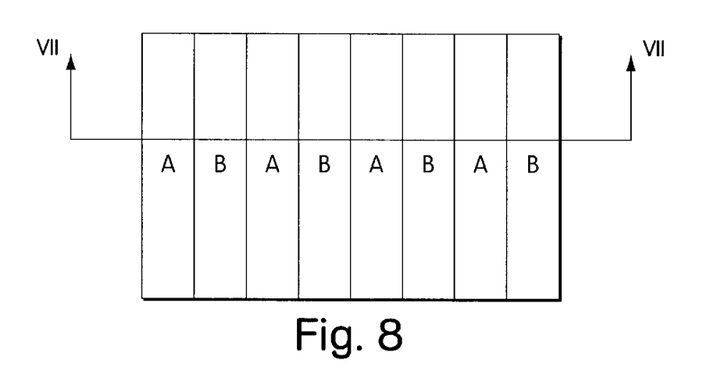
FIGS. 8–10 are schematic top views of exemplary embodiments of the grating of FIG. 7, describing FIGS. 11 and 12 with the following.
Figure 9:
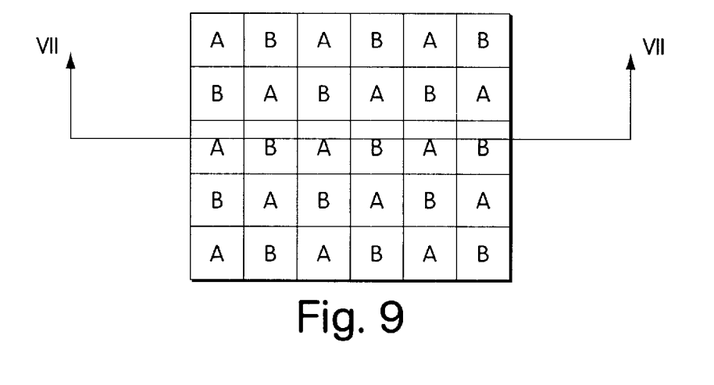
Figure 10:
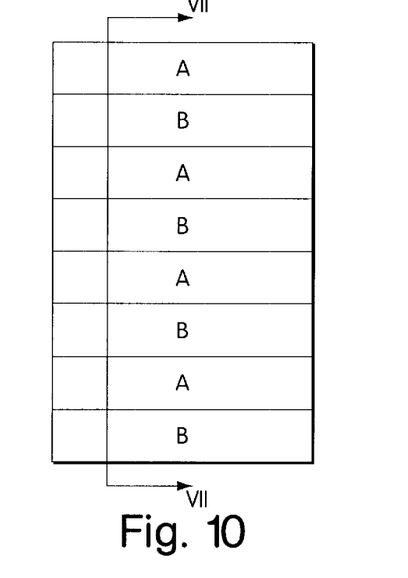
Figure 11:
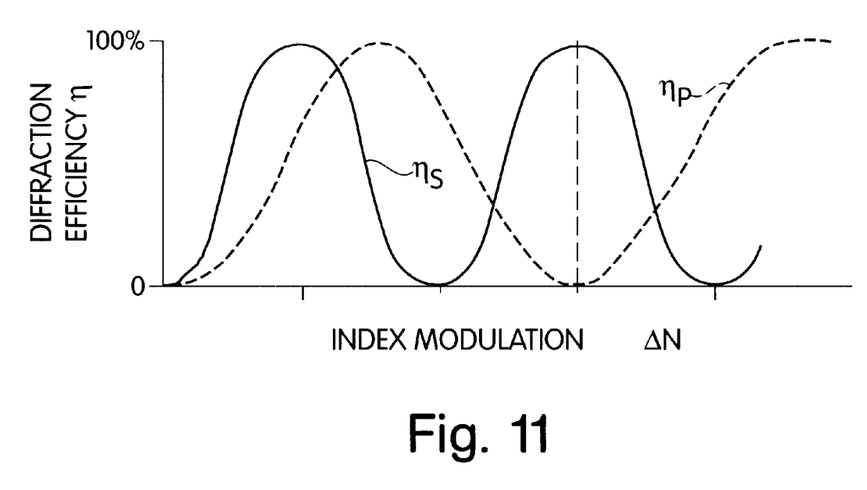
FIG. 11 shows schematically an efficiency curve of a holographic grating for two orthogonal polarization directions "S" and "P" as a function of index modulation.

As seen in FIGS. 8–10, the grating sections can be arranged in various geometrical patterns. The illustrated patterns are exemplary only and in no way intended to limit the invention. For example, as shown in FIG. 8, the grating sections A and B can be arranged side-by-side, with the grooves of the respective grating sections extending along the entire length of the grating. FIG. 7 then represents a cross-section taken along the line VII–VII of FIG. 8. FIG. 9 depicts a layout of the grating sections A and B in a checkerboard pattern, producing a grating efficiency response that can be less sensitive to lateral movement of the light beam(s) illuminating the grating. In an alternative layout depicted in FIG. 10, the different grating sections can be arranged one on top of the other, with the grooves of the respecting grating sections oriented at a non-zero angle with respect to the joint between the grating sections . As mentioned above, the depicted patterns are to be understood as exemplary only, so that the area covered by the different grating sections A, B can be different and/or different numbers of grating sections could be combined into other geometrical patterns, without departing from the spirit of the invention.

Figure 12:
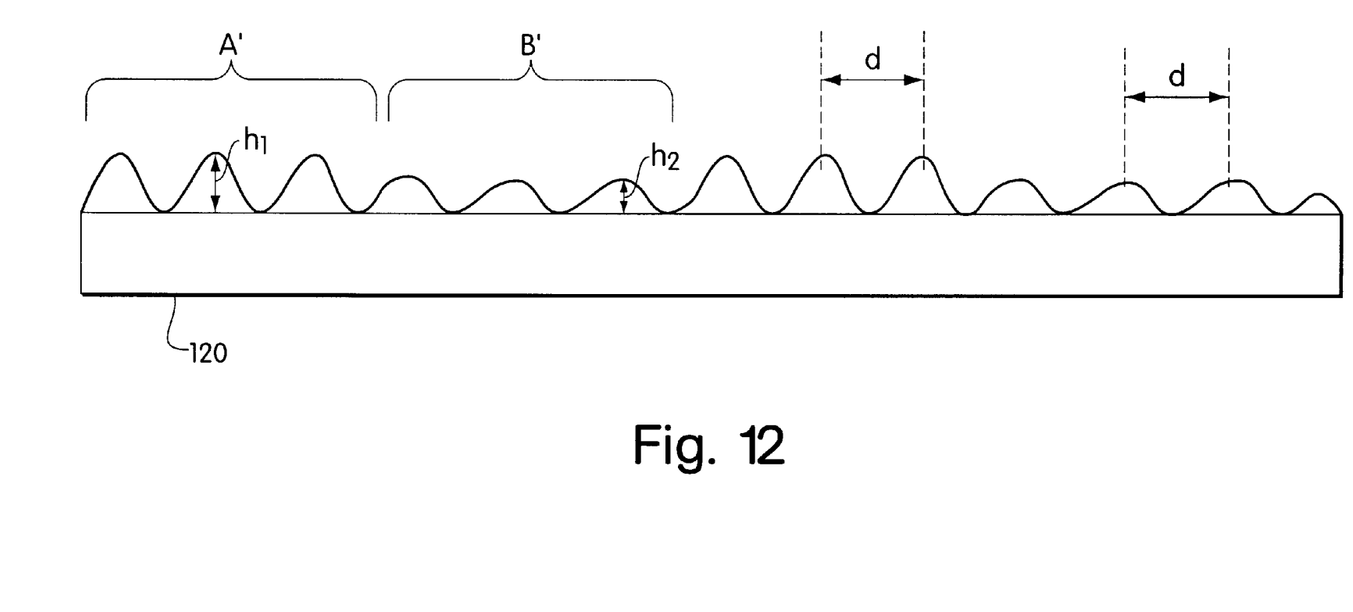
FIG. 12 shows schematically a cross section through a holographic grating having a combination of different grating structures.

As mentioned above, the groove structures can also be generated by a holographic method, producing a substantially sinusoidal grating relief pattern, as shown in cross-section in FIG. 12. As described above with reference to FIG. 7, the exemplary holographic grating has a first grating section A' with three sinusoidal grooves with a first height $h_1$, alternating with a second grating section B' with three sinusoidal grooves with a second height $h_2$ that is different from $h_1$. The grating pitch d for A' and B' is identical. Again, the number of grooves of each grating section is to be understood as being exemplary only, with each section including more or less than three grooves, such as a single groove, and/or the grating sections could be arranged in different patterns similar to those depicted in FIGS. 8–10.

Holographic diffraction gratings can be produced so that, like with blazed gratings, "S"-polarized light is affected different from "P"-polarized light.

From the coupled wave theory, approximate expressions of a diffraction efficiency $\eta_s$ and $\eta_p$ for S- and P-polarized light, respectively, are as follows:

$$\eta_s = \sin^2\left(\frac{\pi \Delta n\, h}{\pi\sqrt{\cos\theta}}\right), \text{ and} \qquad (1)$$

$$\eta_p = \sin^2\left(\frac{\pi \Delta n\, h \sqrt{\cos\theta}}{\lambda}\right) \qquad (2)$$

where $\Delta n$ is a refractive index modulation, h is the height of the hologram ($h_1$ and $h_2$ in FIG. 12), $\lambda$ is a wavelength of light, and $\Theta$ is a diffraction angle (corresponding to the angle $\Theta'$ of FIG. 1).

The slope of the diffraction efficiencies $\eta_s$ and $\eta_p$ as a function of the wavelength $\lambda$ can be computed as:

$$\frac{\partial \eta_s}{\partial \lambda} = -\sin\left(\frac{2\pi \Delta n\, h}{\lambda \sqrt{\cos\theta}}\right) \times \frac{2\pi \Delta n\, h}{\lambda^2 \sqrt{\cos\theta}} \quad (3)$$

$$\frac{\partial \eta_P}{\partial \lambda} = -\sin\left(\frac{2\pi \Delta n h \sqrt{\cos\theta}}{\lambda}\right) \times \frac{2\pi \Delta n h \sqrt{\cos\theta}}{\lambda^2} \quad (4)$$

As can be seen from the expressions (1) through (4), the grating efficiency and the slope of the grating efficiency with respect to the wavelength for both the S- and P-polarization directions are sine functions, but have a different period. In analogy to the ruled gratings described with reference to FIGS. 4 and 5, it should therefore be possible to design a holographic grating of the type illustrated in FIG. 12 with at least two different grating structures, wherein grating efficiency for the combined holographic grating composed of the different grating sections is identical for the two orthogonal "S" and "P" polarization directions and wherein the grating efficiency substantially wavelength-independent in that one grating structure has a positive (zero, negative) slope of the grating efficiency as a function of wavelength over a predetermined wavelength range, with the other grating structure having a corresponding negative (zero, positive) slope over the same wavelength range. It will be understood that such grating can be produced by suitably adjusting any of the parameters in the argument of the sine function, such as the height $h_i$ of the grating relief pattern and/or the refractive index change $\Delta n$.

Grating section A' is to be understood as producing the grating efficiency response similar to that of FIG. 4, with the grating section B' producing the grating efficiency response similar to that of FIG. 5, or vice versa. However, the "S" and "P" diffraction efficiency characteristics will generally be different from those of ruled gratings. However, the same logic applies to these diffraction gratings in that two different modulation values $h_1$ and $h_2$ may be used, performing essentially the role of the blaze angle $\beta_1$ and $\beta_2$ of the grating of FIG. 7. A combination of the grating efficiency curves for the two different polarization directions will yield an averaged uniform polarized efficiency curve similar to that of FIG. 6.

Figure 13:
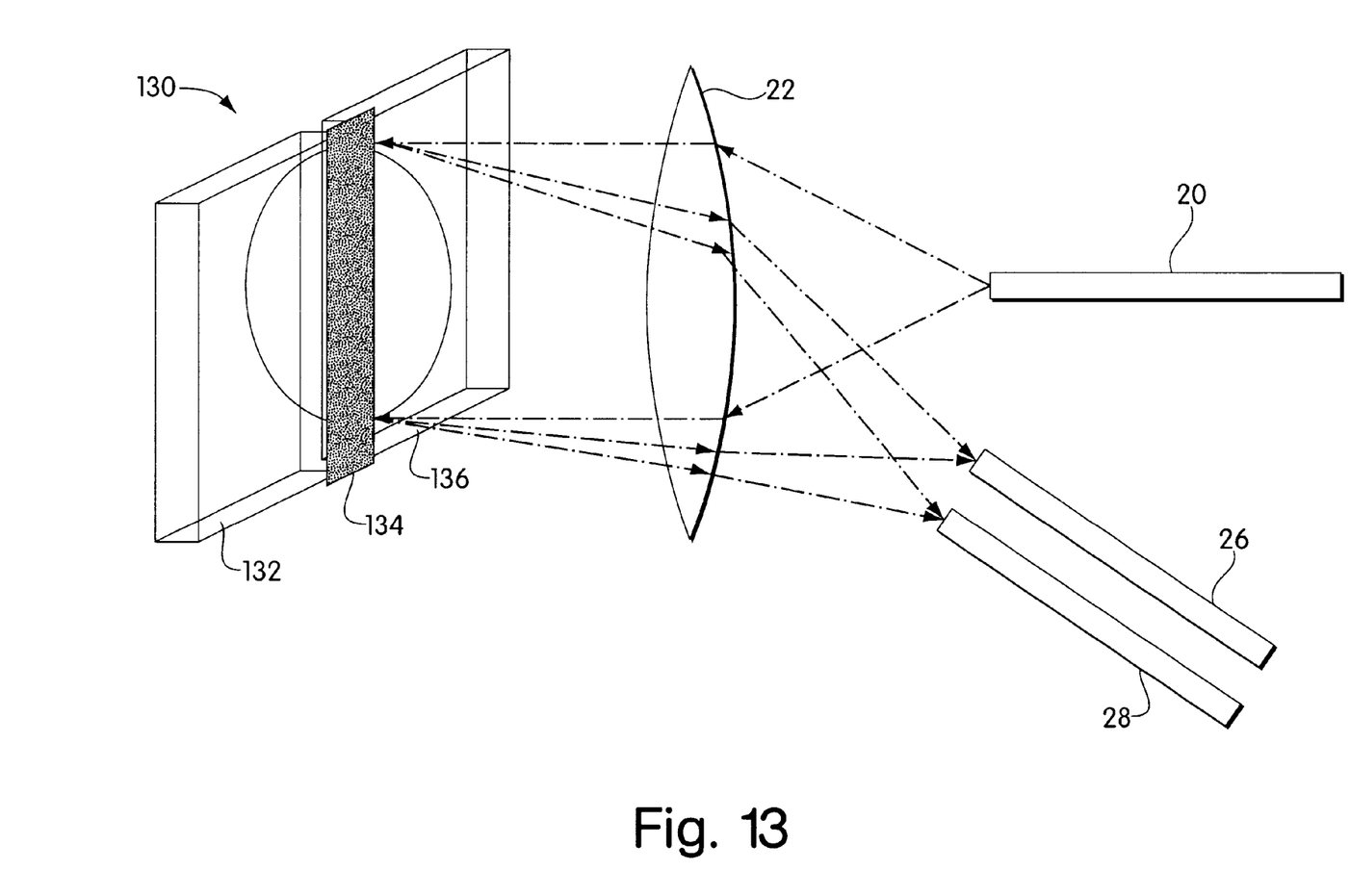
FIG. 13 shows schematically an apodized joint between two adjacent grating structures.

Referring now to FIG. 13, the area where two different grating structures 132, 136 corresponding to the grating sections A, B and A', B', respectively, of a grating 130 according to the invention are joined can be apodized by a cover strip 134 to reduce scattering effects at the joint.

The polarization-independent surface grating structures described above with reference to FIGS. 7 and 12 can replace the gratings 24, 34 of the prior art devices illustrated in FIGS. 2 and 3 or other wavelength-dispersive components in optical systems that have detrimental polarization-dependent characteristics. This type of device is desirable, for example, as a wavelength division multiplexer/demultiplexer for the fiberoptic telecommunications market.

While the invention has been disclosed in connection with the preferred embodiments shown and described in detail, various modifications and improvements thereon will become readily apparent to those skilled in the art. For example, the different groove structures can be modified to be different from either the triangular shape produced by a ruling engine or the sinusoidal groove shape produced by holography. The only requirement is that the different grove shapes provide a suitable grating efficiency for the different polarization directions over the intended wavelength range. The grating sections in the illustrated embodiments are located on a common plane, or in the case of a curved grating of the type depicted in FIG. 3, on a common curved surface. However, the various grating sections may also be arranged sequentially along the optical path, similar to the gratings of a dual-grating spectrometer. However, the diffraction efficiency would then be substantially reduced, being equal to the product of the individual diffraction efficiencies instead of the arithmetic mean of these efficiencies. Accordingly, the spirit and scope of the present invention is to be limited only by the following claims.

What is claimed is:

1. An optical surface grating device having a diffraction efficiency substantially independent of a light polarization direction over a preselected wavelength range comprising:

at least one first grating element having a diffraction efficiency, a grating period and a first height defining a modulation depth of a first grating relief pattern, and at least one second grating element having the grating period, and a diffraction efficiency and a second height defining a modulation depth of a second grating relief pattern, with the second height being different from the first height, wherein the at least one first and second grating elements are arranged substantially side-by-side to form the optical surface grating device and the first height and the second height are selected so that an average value formed from the diffraction efficiencies of the first and second grating elements over the preselected wavelength range is substantially identical for two orthogonal polarization directions, and wherein the first height and the second height are selected so that a slope of the diffraction efficiency of the first grating element as a function of wavelength over the predetermined wavelength range is opposite in sign from a slope of the diffraction efficiency of the second grating element over the predetermined wavelength range, so as to provide a substantially wavelength-independent diffraction efficiency of the grating device.

2. The grating device of claim 1, wherein the average value is weighted according to a ratio of surface areas of the first and second grating elements exposed to optical radiation illuminating the grating device.

3. The grating device of claim 1, wherein the grating elements are ruled gratings or etched gratings.

4. The grating device of claim 3, wherein the respective heights of the first and second grating relief patterns define respective blaze angles.

5. The grating device of claim 1, wherein the grating elements are holographic gratings.

6. The grating device of claim 1, wherein the first and second grating elements are arranged in a geometrical pattern on a common surface.

7. The grating device of claim 6, wherein the geometrical pattern is a checkerboard pattern.

8. The grating device of claim 6, wherein the geometrical pattern is a stripe pattern.

9. The grating device of claim 8, wherein the first and second grating relief patterns are in the form of linear stripes and the linear stripes are arranged to be parallel to the stripe pattern.

10. The grating device of claim 8, wherein the first and second grating relief patterns are in the form of linear stripes and the linear stripes are arranged to be at a non-zero angle with respect to the stripe pattern.

11. The grating device of claim 6, wherein the common surface is one of planar or curved.

12. The grating device of claim 1, wherein the first and second grating elements are arranged side-by-side and an area where the first and second grating elements are joined is apodized.

13. An optical wavelength division demultiplexer having a substantially polarization-independent response over a predetermined wavelength range, comprising:

at least one optical illumination source, a grating device receiving optical radiation from the illumination source, the grating device including at least one first grating element having a grating period and a first height defining a modulation depth of a first grating pattern, at least one second grating element having the grating period and a second height defining a modulation depth of a second grating relief pattern, with the second height being different from the first height, and a plurality of optical receiving devices receiving wavelength-selected diffracted optical radiation from the grating device, wherein the first and second grating elements are arranged substantially side-by-side to form the optical surface grating and the first height and the second height are selected so that an average value formed from the diffraction efficiencies of the first and second grating elements over the preselected wavelength range is substantially identical for two orthogonal polarization directions and an intensity of the wavelength-selected diffracted optical radiation is substantially independent of a direction of polarization of the at least one optical illumination source, and wherein the first height and the second height are selected so that a slope of the diffraction efficiency of the first grating element as a function of wavelength over the predetermined wavelength range is opposite in sign from a slope of the diffraction efficiency of the second grating element over the predetermined wavelength range, so as to provide a substantially wavelength-independent diffraction efficiency of the grating device.

14. An optical wavelength division multiplexer having a substantially polarization-independent response over a predetermined wavelength range, comprising:

a plurality of optical illumination sources, a grating device receiving optical radiation from the illumination sources, the grating device including at least one first grating element having a grating period and a first height defining a modulation depth of a first grating relief pattern, at least one second grating element having the grating period and a second height defining a modulation depth of a second grating relief pattern, with the second height being different from the first height, and at least one optical receiving device receiving wavelength-combined diffracted optical radiation from the grating device, wherein the first and second grating elements are arranged substantially side-by-side to form the optical surface grating and the first height and the second height are selected so that an average value formed from the diffraction efficiencies of the first and second grating elements over the preselected wavelength range is substantially identical for two orthogonal polarization directions, and an intensity of the wavelength-combined diffracted optical radiation is substantially independent of a direction of polarization of the plurality of optical illumination sources, and wherein the first height and the second height are selected so that a slope of the diffraction efficiency of the first grating element as a function of wavelength over the predetermined wavelength range is opposite in sign from a slope of the diffraction efficiency of the second grating element over the predetermined wavelength range, so as to provide a substantially wavelength-independent diffraction efficiency of the grating device.

15. A method of producing diffracted optical radiation that is substantially independent of a polarization direction of illuminating optical radiation over a preselected wavelength range, comprising:

diffracting a first portion of the illuminating optical radiation on at least one first grating element having a grating period and a first height defining a modulation depth of a first grating relief pattern, diffracting a second portion of the illuminating optical radiation on at least one second grating element having the grating period and a second height different from the first height, with the second height defining a modulation depth of a second grating relief pattern, and combining the diffracted first and second portions to form the diffracted optical radiation, wherein the first height and the second height, and the first portion and the second portion, respectively, are selected so that an average value formed from the diffraction efficiencies of the first and second grating elements over the preselected wavelength range is substantially identical for two orthogonal polarization directions, and wherein the first height and the second height are selected so that a slope of a diffraction efficiency of the first grating element as a function of wavelength over the predetermined wavelength range is opposite in sign from a slope of a diffraction efficiency of the second grating element over the predetermined wavelength range, so that an average value formed from the diffraction efficiencies of the first and second grating elements over the preselected wavelength range is substantially independent of wavelength.

* * * * *